(12) United States Patent
Fisher et al.

(10) Patent No.: US 6,276,244 B1
(45) Date of Patent: *Aug. 21, 2001

(54) CUTTING TOOL FOR FORMING PARALLEL GROOVES IN A TUBULAR MEMBER

(75) Inventors: John Harry Fisher, Novi, MI (US); Kevin Michael Ahaus, Richmond, IN (US)

(73) Assignee: Visteon Global Technologies, Inc., Dearborn, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/195,526

(22) Filed: Nov. 19, 1998

(51) Int. Cl.[7] ........................................ B23B 3/22
(52) U.S. Cl. ........................ 82/113; 82/131; 82/138
(58) Field of Search ............................ 82/46, 56, 100, 82/101, 113, 138, 158, 130, 131; 407/42, 113, 114, 115, 116, 24, 25, 12, 23, 29, 28, 27, 70; 409/74, 65

(56) References Cited

U.S. PATENT DOCUMENTS

| | | | |
|---|---|---|---|
| 3,059,317 | * 10/1962 | Pomernacki | 407/23 |
| 3,165,768 | * 1/1965 | Herbkersman | 82/130 X |
| 3,371,567 | 3/1968 | Davis . | |
| 3,630,109 | * 12/1971 | MacMichael et al. | 82/4 C |
| 3,699,828 | * 10/1972 | Piatek et al. | 82/4 C |
| 4,050,335 | 9/1977 | Gilmore . | |
| 4,109,635 | 8/1978 | Rossborough . | |
| 4,423,991 | * 1/1984 | Derr, Jr. | 82/131 X |
| 4,487,534 | * 12/1984 | Reiter | 407/114 |
| 4,819,525 | * 4/1989 | Rabe | 82/1.11 |
| 4,955,937 | 9/1990 | Dona et al. . | |
| 5,370,023 | 12/1994 | Morgan et al. . | |
| 5,791,832 | 8/1998 | Yamayose . | |
| 5,873,681 | * 2/1999 | Pfob et al. | 407/42 |

FOREIGN PATENT DOCUMENTS

| | | |
|---|---|---|
| 0 261 465 A2 | 9/1987 | (EP) . |
| 0 645 208 A1 | 9/1994 | (EP) . |
| 2241450 | 9/1991 | (GB) . |
| 197102 | 9/1986 | (JP) . |
| 07314205 | 12/1995 | (JP) . |

* cited by examiner

*Primary Examiner*—Henry Tsai
(74) *Attorney, Agent, or Firm*—Larry I. Shelton

(57) ABSTRACT

An apparatus for simultaneously forming a plurality of closely spaced, parallel grooves having a web between them in a thin-walled tube is described. The apparatus includes a tube holding mechanism, a rotating cutting tool and a device for driving the cutting tool. The cutting tool includes a single insert form cutter for forming the grooves. The insert includes a plurality of cutting blades and chip relief members which prevent chips from building up in the tool. The chip relief members are generally triangle-shaped and are disposed on the cutting edge of the insert form cutter.

11 Claims, 2 Drawing Sheets

CUTTING TOOL FOR FORMING PARALLEL GROOVES IN A TUBULAR MEMBER

BACKGROUND OF THE INVENTION

1. Field of the Invention

The present invention relates generally to cutting tools and machines for forming grooves. More particularly, the present invention relates to cutting tools for forming a plurality of parallel grooves in a thin-walled tubular member.

2. Disclosure Information

Multiple, parallel grooves have been formed in tubular members by using multiple cutting tools rotating around the tubular member. These cutting tools have to be constantly monitored to insure that each tool is cutting a respective groove to the same dimensions as its counterpart tools. Often, one tool will wear prematurely before the others, making it necessary to remove all the tools, and either replace them entirely or carefully and exactly machine the multiple tools to the same dimensions. This is a very costly and time consuming process which is difficult to monitor. Also, after the tools are removed and machined, the operator must replace the tools in a proper orientation. Known machines and cutting tools do not provide any mechanism for preventing misalignment of the tools.

Furthermore, the cutting tools are prone to chip buildup. As cutting continues, more cutting chips are formed. If the chips are not directed away from the cutting tools, the tools become clogged and the resultant groove does not meet dimension.

SUMMARY OF THE INVENTION

Therefore, it would be advantageous to provide a cutting tool which overcomes the known problems of prior art tools. It is an object of the present invention to provide a cutting tool which is less costly and more robust than prior tools.

It is a further object of the present invention to provide a cutting tool which forms multiple parallel grooves in a tube using a single cutting tool.

These objects are accomplished by the present invention which comprises an apparatus for simultaneously forming a plurality of closely spaced, parallel grooves having a web between them in a thin-walled tube. The apparatus comprises a tube holder for holding the tube in a fixed position during a cutting operation, the tube holder including an axially reciprocating mandrel operative to reciprocate into the tube prior to forming the grooves and reciprocate out of the tube after the grooves are formed. The apparatus also includes a rotating cutting tool for cutting the grooves in the tube, the cutting tool being operative to rotate about the fixed tube to form the plurality of grooves in the tube. The cutting tool comprises a single insert form cutter having a front face, a rear face, a cutting edge and a bottom edge, the cutting edge being disposed at an angle of between 3–20 degrees to the plane of the front face of the cutter.

The insert form cutter of the present invention comprises a plurality of cutting blades for cutting the grooves, the cutting blades being disposed at the cutting edge and being separated by a predetermined distance, and a plurality of chip relief members. Each one of the plurality of chip relief members is associated with each of the cutting blades and extends across the cutting edge of the insert form cutter from the front face to the rear face of the cutter. Each chip relief member is generally triangularly-shaped, having a first side of predetermined width at the cutting blade and two converging sides extending toward the rear face of the cutter to form an angle of between 3 to 15 degrees.

The present invention further includes a tool holder for holding the insert form cutter, the holder including means for preventing misalignment of the cutter therein. The misalignment means comprises a cavity of predetermined configuration such that the insert form cutter matingly engages the cavity only when in proper cutting orientation. A fastener or clip for securing the cutter in the holder is used. The apparatus of the present invention also includes means for driving the cutting tool assembly into and out of engagement with the tube.

It is an advantage of the present invention that a single cutting tool can be used, thereby saving labor and costs associated with forming a plurality of grooves in a tube. These and other advantages, objects and features of the present invention will become apparent from the drawings, detailed description and claims which follow.

DETAILED DESCRIPTION OF THE PREFERRED EMBODIMENTS

Figure 1:
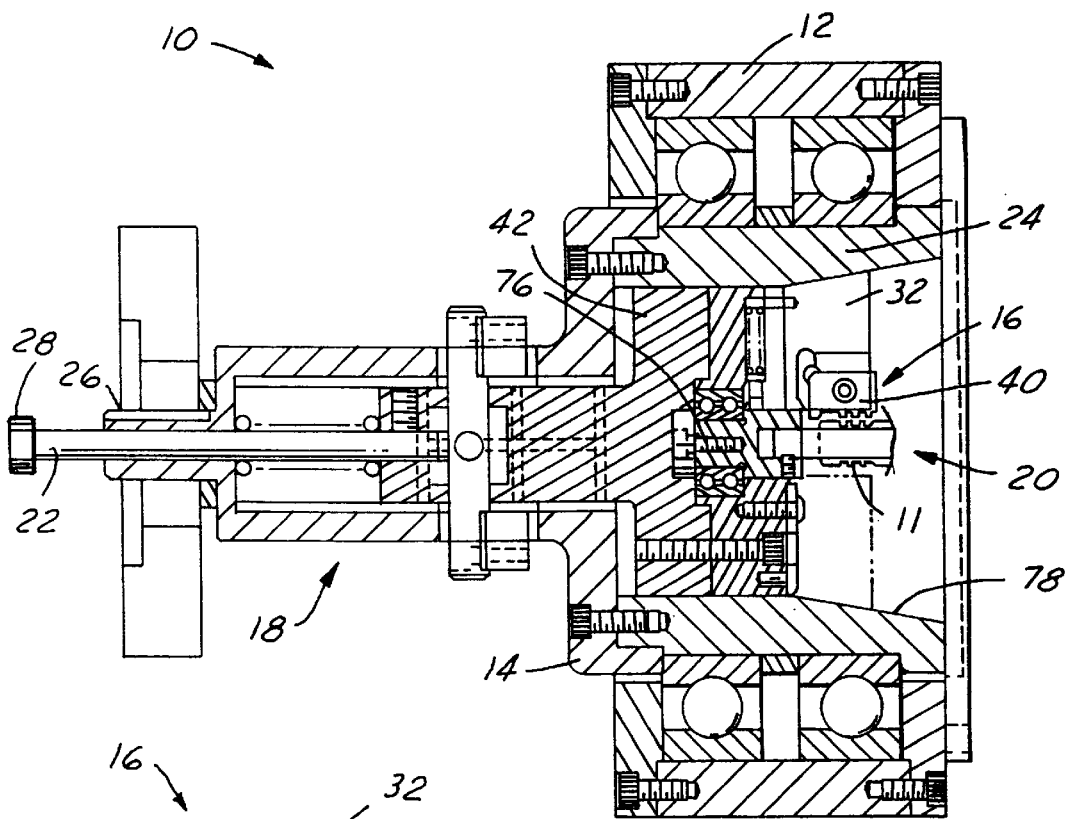
FIG. 1 is a schematic view of a cutting tool structured in accord with the principles of the present invention.
Figure 2:
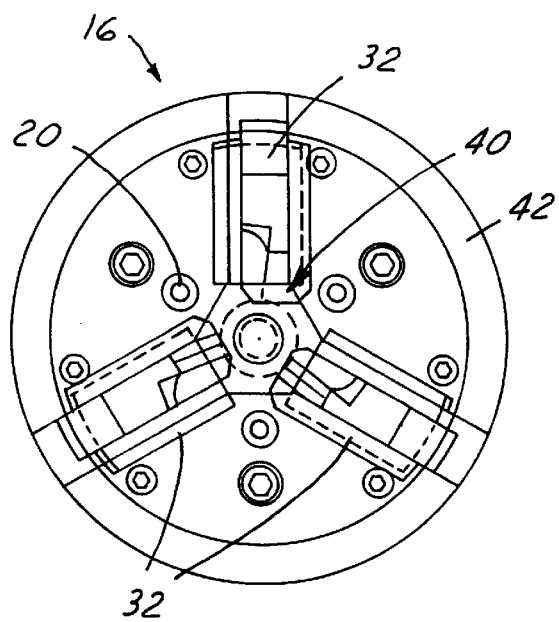
FIG. 2 is an enlarged view of a portion of the apparatus of the present invention.
Figure 3:
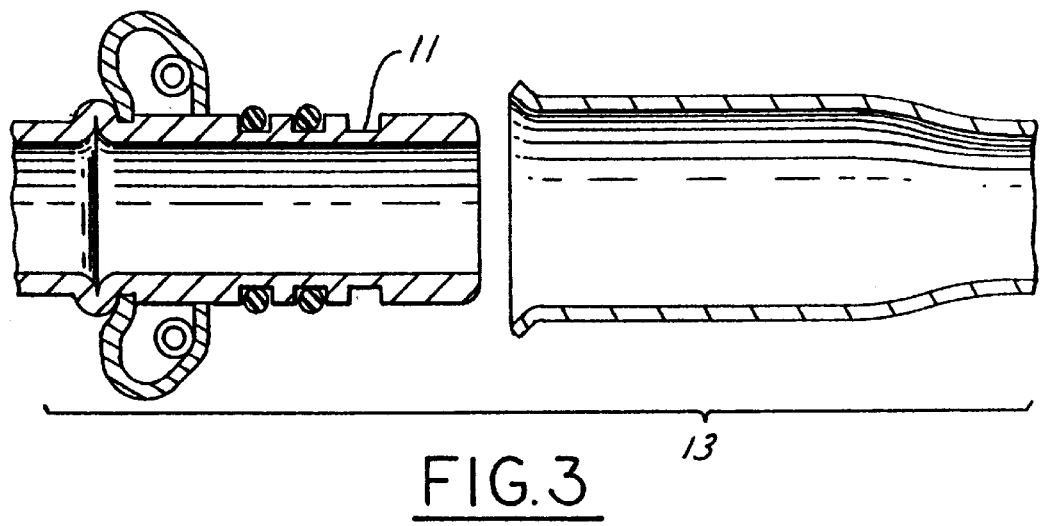
FIG. 3 is a perspective view of a tubular member having a plurality of parallel grooves formed according to the present invention.

Referring now to the drawings, FIGS. 1 and 2 show an apparatus 10 for forming a plurality of parallel grooves in thin-walled tubing. For example, the apparatus 10 of the present invention can be used for forming parallel grooves 11 for holding O-rings in a thin-walled aluminum tube to be joined to a second tube such as shown in FIG. 3. One such tube arrangement is commonly known as a spring lock tubular coupling 13, such as is shown in U.S. Pat. No. 5,816,626, assigned to the assignee of the present invention. The present invention will be explained with reference to a tubular coupling, but the present invention can be utilized for other applications as well.

The apparatus 10 includes a frame 12 securing a tool housing 14. The housing contains a cutting tool assembly 16 mechanically connected to a drive mechanism 18. The drive mechanism 18 operates to place the cutting tool assembly 16 into and out of engagement with a tube 20 to be machined and includes a drive shaft 22 connected to a cam member 24. The drive shaft 22 axially reciprocates within a spindle 26 to cause the cam member 24 to move. A tooling stop member 28 is fixed on the drive shaft 22 to limit the travel of the shaft relative to the tool housing 14.

As shown in FIG. 2, the cutting tool assembly 16 is disposed within the tool housing 14. The cutting tool assembly 16 rotates about the tube 20 to cut the grooves therein and includes a plurality of cutter holders 32 and an insert form cutter 40 which seats into the cutter holder 32. The cutter holders 32 are disposed equally in a generally circular member 42 which rotates about the tube 20. The cutter holders 32 reciprocate radially toward the center of the circular member 42 to engage the tube 20 extending therethrough.

Figure 4:
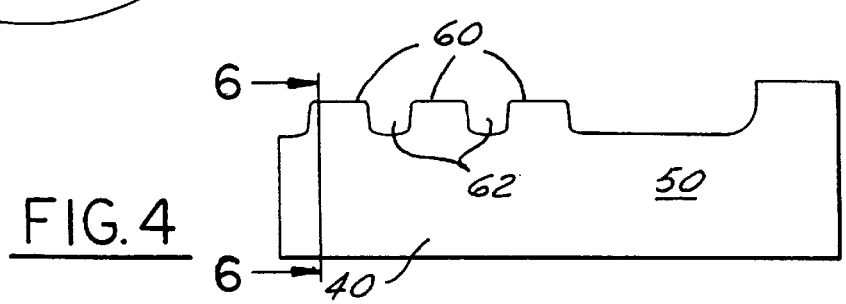
FIG. 4 is a side elevational view of an insert form cutting tool of the present invention.
Figure 5:
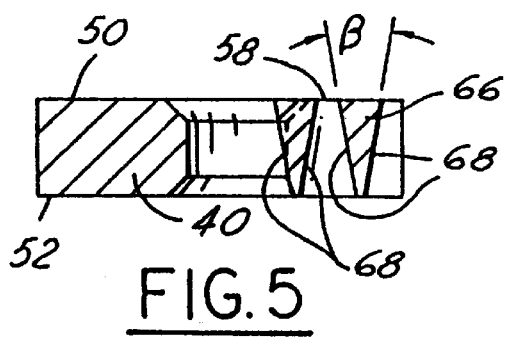
FIG. 5 is a top plan view of the cutter of FIG. 4.
Figure 6:
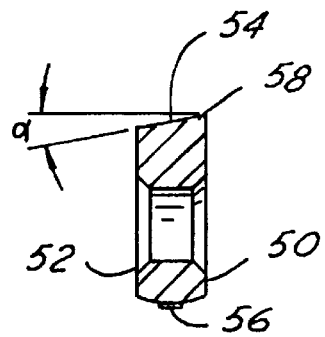
FIG. 6 is a cross-sectional view of the cutter taken along lines 6—6 of FIG. 4.

As shown in FIGS. 4–6, the insert form cutters 40 of the present invention are generally rectangularly-shaped and include a front face 50, a rear face 52, a cutting edge 54 and a bottom edge 56. The cutting edge 54 is disposed at an angle, $\alpha$, of between five and twenty degrees, preferably approximately twelve degrees relative to a plane perpendicular to the plane of the front face 50. This defines a cutting line 58 along the cutting edge 54 of the insert 50. The insert 50 also includes a plurality of cutting blades 60 which form the parallel grooves in the tube 20. The cutting blades 60 are disposed along the cutting line 58 and are spaced a predetermined distance apart. As shown in the present example, three cutting blades 60 are shown, having two spaces 62 disposed between the blades. The spaces 62 allow webs to be formed between the grooves in the tube. However, the insert form cutter 40 can be formed to include any number of cutting blades 60, including one blade.

The insert form cutter 40 also includes a plurality of chip relief members 66. Each chip relief member 66 is generally shaped as a triangle and extends across the cutting edge 54 of the cutter, beginning at the cutting blade 60. The chip relief members 66 include two sides 68 which converge at the rear face 52 on the cutting edge 54. The converging sides 68 meet to form an angle, $\beta$, of between three and fifteen degrees, with the preferred angle being approximately ten degrees. These converging sides 68 are instrumental in preventing chip buildup in the cutting tool during forming of the grooves. The insert form cutter 40 can be manufactured from any material used for cutting, such as tool steels and carbides. The present invention is not meant to be limited to a specific material.

Figure 7:
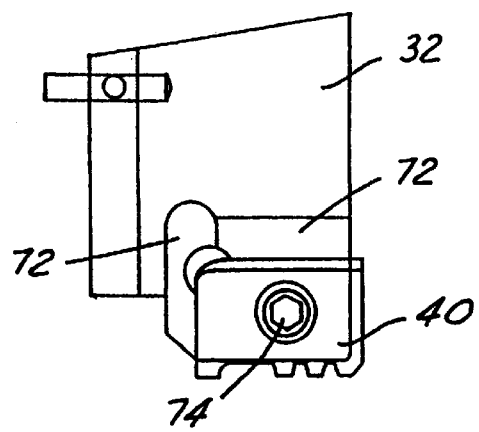
FIG. 7 is a perspective view of the insert cutter of the present invention placed is the cutting tool.

As shown in FIG. 7, the cutting tool assembly 16 includes the insert form cutter holder 32 and cutter 40. The cutter holder 32 has a cavity 72 in the holder which has been shaped to matingly engage the cutter 40. The engagement is only possible when the cutter 40 is oriented properly, thereby providing means for preventing misalignment of the cutter 40. A fastener 74 or other known clip is used to secure the cutter 40 into its holder 32 and not hinder chip removal.

In operation, the tube 20 to be machined is placed in the apparatus 10. The drive mechanism of the apparatus moves the drive shaft 22 to begin moving the cam member 24 toward the tube 20. A mandrel 76 disposed internally of the cam member 24 reciprocates into the tube 20 to prevent the tube from deforming during the cutting operation. As the cam member 24 moves toward the tube, its angled interior sides 78 contact the tool holders 32 forcing them radially into engagement with the tube 20. The insert form cutter contacts the tube 20. Once in proper location, as determined in any number of known ways, such as by pressure, distance, or electronic eye, the cutting tool assembly 16 rotates about the tube 20, causing the insert form cutter to cut a plurality of grooves into the tube.

As the cutting tool is rotating, the cutting blades 60 are cutting the wall of the tube. This produces fine chips which are directed away from the tool by the angled cutting edge 54 as well as the chip relief members 66. By being tapered, the chip relief members 66 provide an increasing amount of free area for the chips to pass through, thereby preventing a buildup. After a predetermined stop location is reached or timer conditions are met, the cam member 24 reciprocates in the opposite direction, lifting the cutting tool away from the tube. The mandrel is removed from the interior of the tube 20, and the tube is removed and replaced with a new tube to be cut.

It is important to note that a single insert form cutter can be used with an existing and known apparatus for forming grooves into a tubular member. In the apparatus described above, the cutting tool included three equally spaced cutter holders. The insert could be placed in a single cutter holder and counter balance weights would be placed in the open holders. Alternatively, a second and third insert form cutter could be placed in the other holders and spaced therein so as not to contact the tube until an adjustment was made.

Various alterations and modifications to the present invention will, no doubt, occur to those skilled in the cutting art. It is the following claims, including all equivalents, which define the scope of the present invention.

What is claimed is:

1. An apparatus for simultaneously forming a plurality of closely spaced, parallel grooves for receiving O-rings therein and having a web between them in a thin-walled tube of an aluminum tubular coupling, the apparatus comprising:

tube holding means for holding said tube in a fixed position during a cutting operation;

a rotating cutting tool for cutting said grooves in said tube, said cutting tool being operative to rotate about said fixed tube to form said plurality of grooves in said tube, said cutting tool comprising:

an insert form cutter extending longitudinally and having a front face, a rear face, a cutting edge and a bottom edge, said insert form cutter comprising a plurality of cutting blades for cutting said grooves, said cutting blades being disposed at said cutting edge and being separated longitudinally by a predetermined distance, said insert form cutter further comprising a plurality of chip relief members, each one of said plurality of chip relief members being operatively associated with each of said cutting blades and extending across said cutting edge of said insert form cutter from said front face to said rear face of said cutter, each chip relief member having a generally trapezoid shape, having a first side of predetermined width at said cutting blade, a second side and a third side, said second and third sides converging toward each other and extending toward said rear face of said cutter; and a holder for holding said insert form cutter, said holder including means for preventing misalignment of said cutter therein; and means for driving said cutting tool into and out of engagement with said tube.

2. An apparatus according to claim 1, wherein said cutting edge of said insert form cutter is disposed at an angle of between 3–20 degrees relative to a plane perpendicular to the plane of said front face of said cutter.

3. An apparatus according to claim 1, wherein said converging sides of said chip relief member converge to form an angle of between 3 to 15 degrees relative to a plane perpendicular to a plane of said front face.

4. An apparatus according to claim 1, wherein said converging sides of said chip relief member converge to form an angle of approximately 10 degrees.

5. An apparatus according to claim 1, wherein said cutting tool includes three equidistantly spaced holders, only one of which is operative to engage said tube during a cutting operation.

6. An apparatus according to claim 1, wherein said means for preventing misalignment of said insert form cutter in said holder comprises a cavity of predetermined configuration such that said insert form cutter matingly engages said cavity only when in proper cutting orientation.

7. An apparatus according to claim 6, wherein said holder further includes a fastener for securing said cutter in said holder.

8. An apparatus according to claim 1, wherein said insert form cutter is fabricated from a carbide material.

9. An apparatus comprising:

a frame;

a tool housing secured to said frame;

a cutting tool assembly disposed within said tool housing;

a drive mechanism connected to said cutting tool assembly to place said cutting tool assembly into and out of engagement with a tube to be machined;

said cutting tool assembly comprising a plurality of cutter holders, a plurality of insert form cutters, one of said insert form cutters being seated into one of said cutter holders, a generally circular member which rotates about the tube, said cutter holders being disposed about said member;

each of said insert form cutters being generally rectangular-shaped and having a front face, a rear face, a cutting edge, and a bottom edge, said cutting edge being disposed at a first angle to a plane of said front face;

each of said insert form cutters including a plurality of cutting blades which form parallel grooves in the tube, said cutting blades being spaced a predetermined distance apart; and each of said insert form cutters including a plurality of chip relief members, each of said chip relief members extending across said cutting edge and having two sides which converge at said rear face on said cutting edge to form a second angle.

10. An apparatus according to claim 9, wherein said sides of each of said chip relief members converge to form an angle of approximately 10 degrees.

11. An apparatus according to claim 9, wherein each of said insert form cutters is fabricated from a tool steel.

\* \* \* \* \*